United States Patent
Minnick et al.

(10) Patent No.: US 7,225,332 B2
(45) Date of Patent: May 29, 2007

(54) METHODS AND APPARATUS TO PERFORM CRYPTOGRAPHIC OPERATIONS ON RECEIVED DATA

(75) Inventors: Linden Minnick, Hillsboro, OR (US); Avraham Mualem, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 10/322,377

(22) Filed: Dec. 17, 2002

(65) Prior Publication Data

US 2004/0117614 A1    Jun. 17, 2004

(51) Int. Cl.
*H04L 9/00* (2006.01)

(52) U.S. Cl. .......................... 713/160; 726/11

(58) Field of Classification Search ............... 713/160; 726/11, 12, 13, 14
See application file for complete search history.

(56) References Cited

U.S. PATENT DOCUMENTS

| | | | |
|---|---|---|---|
| 6,097,697 A | 8/2000 | Yao et al. | 370/230 |
| 7,003,118 B1* | 2/2006 | Yang et al. | 380/287 |
| 2002/0062333 A1* | 5/2002 | Anand et al. | 709/105 |
| 2003/0005283 A1* | 1/2003 | Mualem et al. | 713/151 |
| 2003/0046585 A1* | 3/2003 | Minnick | 713/201 |
| 2003/0061495 A1* | 3/2003 | Minnick | 713/189 |
| 2003/0135757 A1* | 7/2003 | Connor et al. | 713/201 |
| 2003/0161327 A1* | 8/2003 | Vlodavsky et al. | 370/395.52 |

\* cited by examiner

*Primary Examiner*—Matthew Smithers
(74) *Attorney, Agent, or Firm*—Schwegman, Lundberg, Woessner & Kluth, P.A.

(57) ABSTRACT

Cryptographic operations are performed on data packets received by an electronic system. To improve system performance, incoming packets are associated with a security association and offloaded to dedicated crypto functions, such as Inline Receive or other available, alternative crypto-processing functions. In one embodiment, when Inline Receive is busy or is otherwise unavailable, a most efficient crypto function from alternative processing functions is selected as a function of the security-associated packets to perform crypto operations on an offloaded packet. Various methods, systems, apparatus, and articles comprising a machine-readable medium are also described.

43 Claims, 5 Drawing Sheets

METHODS AND APPARATUS TO PERFORM CRYPTOGRAPHIC OPERATIONS ON RECEIVED DATA

TECHNICAL FIELD

The subject matter relates generally to performing cryptography operations for secure data transmission and, more particularly, to performing cryptography operations on packets received by a network interface (NI).

BACKGROUND INFORMATION

IP Security (IPsec) standard, IP Security Internet Engineering Task Force (IETF) Request for Comments (RFC) 2401, published November 1998, represents a known method of protecting both the confidentiality and integrity of data transferred on a network. Because IPsec provides a way to encrypt and decrypt data below the Transmission Control Protocol (TCP)/User Datagram Protocol (UDP) layer, the protection is transparent to applications that transfer data. Thus, a system may utilize IPsec without requiring changes at the application level. However, the algorithms used for cryptography (crypto) operations, for example, encryption, decryption, and authentication on the data for IPsec require many processor cycles to execute. The processor cycles spent on executing crypto operations on received packets in a traffic stream decrease the number of available processor cycles for applications and other parts of the protocol stack. This in turn can decrease the total throughput of the system.

One solution to this problem is to offload the crypto operations to external hardware, such as a Network Interface Card (NIC). One way to offload the crypto operations is by encrypting data immediately before transmitting packets and decrypting data directly upon receipt before the packets are transferred via Direct Memory Access (DMA) to host memory. A Security Association (SA) is a data structure of cryptography information that contains all of the information necessary to perform crypto operations on a packet. The device that interfaces the system to the network, for example a NIC, detects which SA is needed to process the packets and performs crypto operations on the packets directly upon receipt. The process for decrypting and authenticating ingress data before it is transferred to host memory is called "Inline Receive."

An alternative to Inline Receive is to offload using a "Secondary Use" model. This model uses an out-of-band acceleration method to decrypt received packets. In this model, all received packets in a traffic stream are DMA-transferred to host memory. The network interface driver then parses each received packet to match it with its corresponding SA. Assuming that the crypto accelerator is on the NIC, the driver then instructs the NIC to transfer the packet back to host memory.

Secondary Use results in inefficient use of the available bandwidth on the system bus, because the packet is transferred across the bus three times. Secondary Use also creates additional latency, which can degrade the throughput of protocols sensitive to the round-trip time of packets, for example, TCP. Furthermore, performing extra transfers across the bus often requires the use of additional interrupts, causing the system to do more work, and increasing CPU utilization. From a performance perspective (both CPU utilization and throughput), Inline Receive is preferable to Secondary Use.

However, an Inline Receive function is expensive to implement in hardware, because the keys and matching information for crypto operations typically must be stored on the NIC in an SA cache. Because of this, currently available equipment only supports a limited number of connections that can use Inline Receive. It is common for the number of open connections to exceed the size of the Inline Receive cache. In such situations, other connections have to use the Secondary Use model in order to offload secure traffic. A traditional approach is to add SAs to the Inline Receive cache on a first-come, first-served basis. Under the traditional approach, packets associated with SAs in the cache will be handled using Inline Receive. When there are no available entries in the cache, packets for non-cached SAs must be handled using Secondary Use to process the packets. In some cases, using software instead of Secondary Use to process the packets may yield better performance.

Inline Receive is a preferred method for processing packets but, as mentioned above, Inline Receive can only be used for a limited number of connections. Also, Inline Receive cannot support all packet formats due to hardcoded design. In such and other similar situations, current techniques do not determine which of multiple IP security offloading techniques to use for crypto operations when Inline Receive is not available to improve system performance.

DETAILED DESCRIPTION

The following description discusses techniques to offload incoming packets in a traffic stream for crypto operations to improve throughput and system performance. This is accomplished, in one embodiment, by selecting a most efficient technique from available processing techniques before offloading the packets for crypto operations.

The following detailed description refers to the accompanying drawings that show, by way of illustration, specific embodiments in which the subject matter may be practiced. In the drawings, like numerals describe substantially similar components throughout the several views. These embodiments are described in sufficient detail to enable those skilled in the art to practice the subject matter. Other embodiments may be utilized, and structural, logical, and electrical changes may be made without departing from the scope of the present subject matter. Moreover, it is to be understood that the various embodiments of the subject matter, although different, are not necessarily mutually exclusive. For example, a particular feature, structure, or characteristic described in one embodiment may be included within other embodiments. The following detailed description is, therefore, not to be taken in a limiting sense, and the scope of the present subject matter is defined only by the appended claims, along with the full scope of equivalents to which such claims are entitled.

Figure 1:
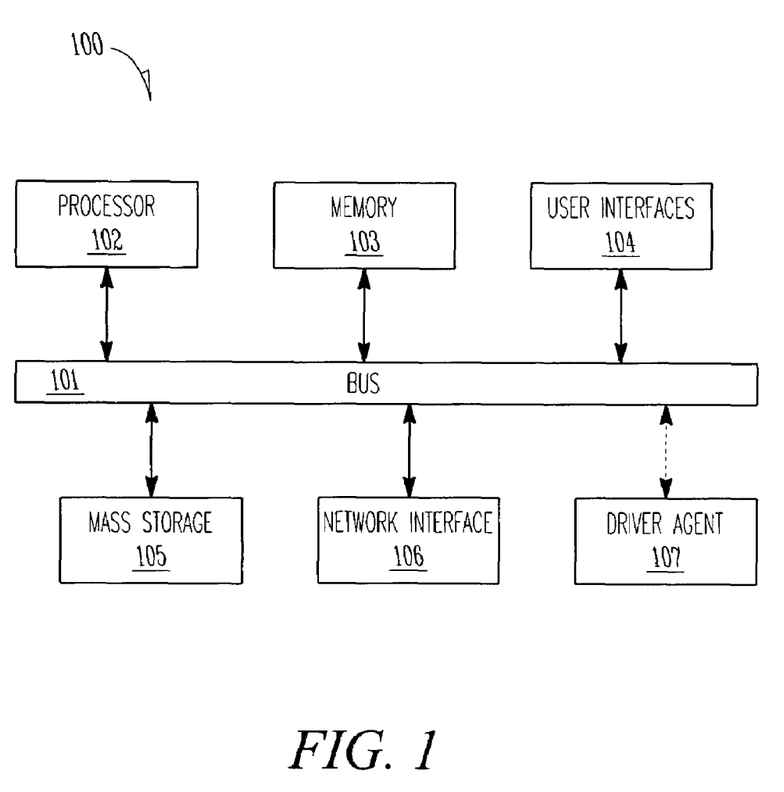
FIG. 1 is a block diagram of an electronic system, in accordance with one embodiment of the present subject matter.

FIG. 1 is a block diagram of an electronic system 100, in accordance with one embodiment of the present subject matter. Electronic system 100 may be, for example, a computer, a personal digital assistant, a set-top box, or any other electronic system designed to receive packets. System 100 includes a bus 101 coupled to a plurality of elements to store and transfer information and to execute instructions. For example, system 100 includes memory 103, coupled to bus 101, to store information and instructions to be executed by a computational machine or processor 102. Memory 103 may also be used to store temporary variables or other intermediate information during execution of instructions by processor 102. Memory 103 may include random access memory (RAM), read-only memory (ROM), flash, or other static or dynamic storage media.

User interfaces 104 are coupled to bus 101 to allow interaction with a system user. Mass storage 105 can be coupled to system 100 to provide instructions to memory 103. Mass storage 105 can be, for example, a magnetic disk or optical disc and its corresponding drive, a memory card, or another device capable of storing machine-readable instructions. Network interface 106 can be coupled to bus 101 to enable system 100 to communicate with other electronic systems via a network.

Driver agent 107 may be coupled to system 100 to perform driver features in hardware and/or software. Driver agent 107 may be an Application Specific Integrated Circuit (ASIC), a special function controller or processor, a Field Programmable Gate Array (FPGA), or other hardware device that performs the functions of a driver. Driver agent 107 is not a necessary part of a system 100.

Electronic system 100 can improve system performance by determining which components of system 100 should handle traffic streams coupled to bus 101 by network interface 106. In some embodiments, driver agent 107 determines which traffic streams should be mapped to more efficient techniques of performing crypto operations based on the value of a corresponding SA metric. For example, driver agent 107 can use threshold values to compare against metric values to use the most efficient technique to perform crypto operations on the packets when Inline Receive is not possible for offloading the packets for crypto operations.

As mentioned above, driver agent 107 can be a hardware driver agent. Alternatively, driver agent 107 can be a software driver agent obtained from a Compact Disk (CD), Digital Versatile Disk (DVD), via a remote connection (e.g., over a network), etc. In some embodiments, hard-wired circuitry can be used in place of or in combination with software instructions to enable system 100 to practice the subject matter. Thus, electronic system 100 depicted above is not limited to any specific combination of hardware circuitry and software structure.

Instructions can be provided in memory 103 from a form of computer-readable media. A computer-readable medium includes any mechanism that provides (i.e., stores and/or transmits) information in a form readable by a machine. For example, a machine-readable medium includes read only memory (ROM); random access memory (RAM); magnetic disk storage media; optical storage media; flash memory devices; electrical, optical, acoustical or other forms of propagated signals (e.g., carrier waves, infrared signals, digital signals); etc.

Figure 2:
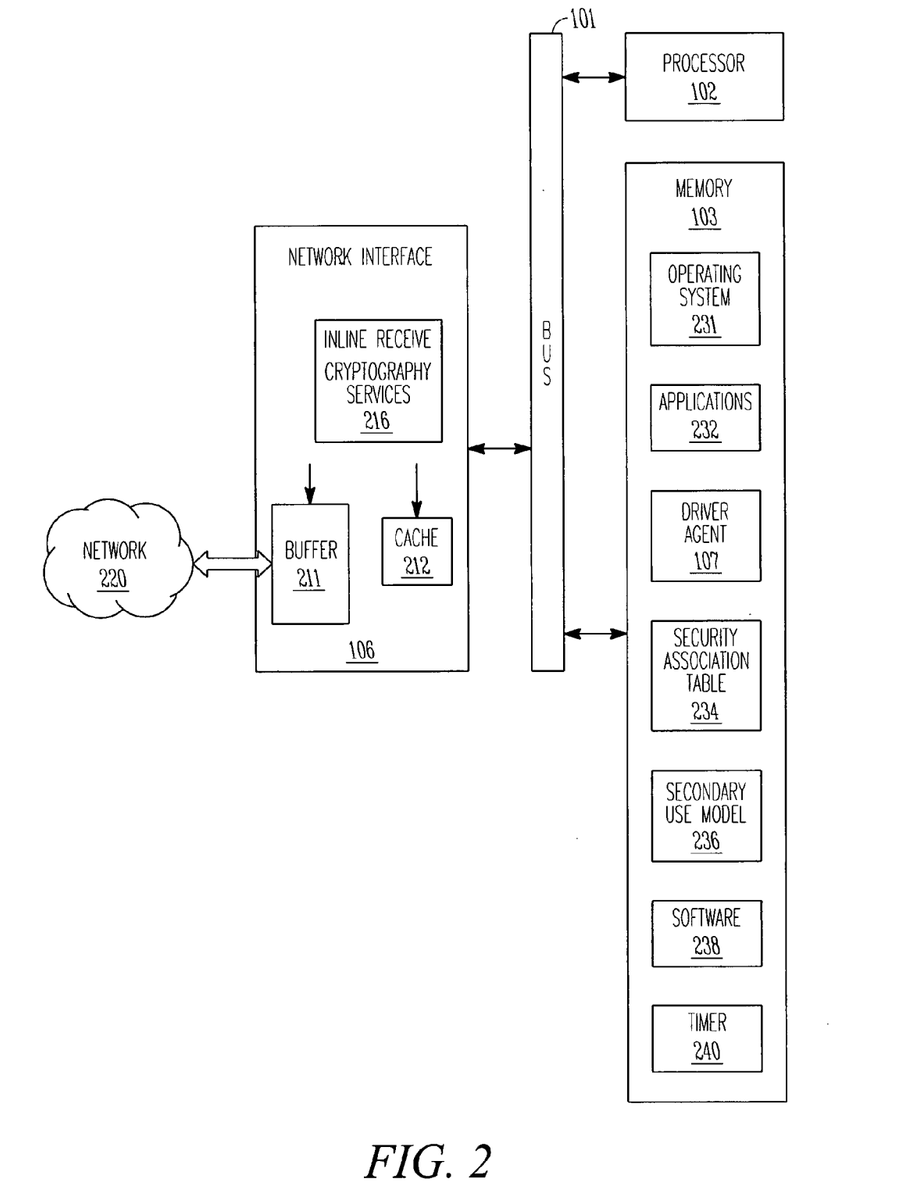
FIG. 2 is a block diagram of the electronic system shown in FIG. 1 without the user interfaces and mass storage.

FIG. 2 is a block diagram of the electronic system 100 shown in FIG. 1 without the user interfaces 104 and mass storage 105. FIG. 2 shows bus 101, processor 102, memory 103, network interface (NI) 106, and driver agent 107 shown in FIG. 1. In some embodiments, NI 106 is a communication interface that enables an electronic system to communicate with other electronic systems coupled to network 220. For example, NI 106 can be a Network Interface Card (NIC).

Generally, computing platforms coupled to a transmission medium are coupled through an Input/Output (I/O) device such as a NIC, which may alternatively be referred to as a server adapter, network adapter, or media access card, but the claimed subject matter is not limited in this respect. There are many types and categories of NICs, and the claimed subject matter is not limited to any particular type of NIC, and it may include external NICs, onboard NICs, or peripheral NICs, without limitation. One such NIC comprises an Ethernet Media Access Controller (MAC). Such NICs may manage data transfer between a computer and a network, and may operate using a particular type of protocol.

There are many versions of protocols that may be used to practice the claimed subject matter, including Ethernet, Fast Ethernet, Gigabit Ethernet, 10 Gigabit Ethernet, and 40 Gigabit Ethernet which, as is well known, relate to a 10, 100, 1000, 10,000, and 40,000 Megabits per second (Mb/s) rate of electronic data transfer, respectively, although the claimed subject matter is not limited to just Ethernet protocol. Gigabit Ethernet protocol is defined for data transfer over fiber optic cable in the Institute of Electrical and Electronics Engineers (IEEE) Standard 802.3z, and for data transfer over CAT 5 cable in IEEE Standard 802.3ab. Additional details regarding this protocol can currently be found on the World Wide Web at the following URL: http://www*gigabit-ethernet*org. (To avoid an inadvertent hyperlink, the periods in the preceding URL have been replaced by asterisks.) NICs such as the type previously described may operate by utilizing at least one device driver.

In some embodiments, traffic streams are received from network 220 into buffer 211 on NI 106. Each traffic stream includes a data stream of packets. NI 106 determines whether the necessary SA information is in a cache 212 to perform crypto operations on the packets. If the SA information is in the cache 212, the packets are decrypted and/or authenticated before they are transferred across bus 101 to memory 103. Memory 103 contains Operating System (OS) 231, which controls the flow of instructions to network interface processor 102. In some embodiments, OS 231 is the highest layer of control of the electronic system. Driver agent 107 is a lower layer of system control.

In some embodiments, OS 231 delivers SAs to driver agent 107. In some embodiments, applications 232 can contain agents of a higher layer of control than driver agent 107 and deliver SAs to driver agent 107. Applications 232 can also contain other programs (e.g., word processor(s); electronic mail (e-mail) programs). Memory 103 can also contain an SA table 234 that is a data structure of SAs. In some embodiments, driver agent 107 accesses SA table 234 to determine how to map traffic streams to one of the alternative, available components that perform crypto operations.

In operation, NI 106 receives a data stream of packets from network 220. The received packets can include, for example, data packets and/or latency-sensitive packets. The received packets are then offloaded to driver agent 107 for crypto operations, when NI 106 is not available to perform crypto operations on the received packets. In some embodiments, NI 106 includes inline receive cryptographic services element 216 (usually shortened to "inline receive element" or "inline receive function" or simply "Inline Receive") to perform crypto operations efficiently on the received packets. Inline receive element 216 is a preferred function or component for processing the received packets, since it is more efficient than using secondary use model 236 or software 238 components. In some embodiments, NI 106 offloads the received packets to driver agent 107, when inline receive element 216 is not available to perform crypto operations.

Driver agent 107 then associates the offloaded packets with an SA and dynamically offloads the associated packets to one of the available components to perform crypto operations efficiently on the associated packets based on a metric value to improve throughput and authentication performance. Available components to perform crypto operations on the offloaded packets include components such as, for example, a secondary use model component 236 and a software component 238.

Offloading is a process whereby the host system processor does not perform crypto operations. One form of offloading is an "Inline Receive" operation. With an Inline Receive operation, hardware external to the system processor, for example a processor or co-processor on a NIC, performs crypto operations directly upon receipt. For example, packets entering the system would be operated on before the packets get transferred to host memory.

Other methods are secondary use model 236 and software 238. With secondary use model 236, a driver agent, for example a software network interface driver, uses hardware external to the system processor, for example a processor or co-processor on a NIC, to perform the operations. For example, packets entering the system would be transferred to host memory, and the network interface driver would instruct the NIC hardware to process the packets. Inline Receive is a more efficient method of offloading than secondary use model 236 and software 238 in terms of system performance.

In some embodiments, NI 106 compares the amount of memory available in an Inline Receive cache, such as cache 212, to a threshold cache value, and it then offloads the received packets to driver agent 107 based on the outcome of the comparison. In these embodiments, driver agent 107 further compares the offloaded packets to the metric value and dynamically offloads the packets to use a most efficient component of the alternative, available components for performing crypto operations based on the outcome of the comparison to improve performance. In these embodiments, the metric value is based on a policy metric that improves system performance.

The policy metric is based on policy combinations for which the secondary use model 236 is less efficient than software 238 processing. An example of such a policy is "MD5" authentication using "AH." "MD5" is an authentication algorithm, and "AH" is the name of the header that is present in the packets associated with this policy. A "policy", such as MD5, can be defined as a set of algorithms mapped to a set of header types. Performance tests have shown that offloading data in such situations to a secondary use model 236 results in throughput reduction and increased CPU utilization. Therefore, in such situations, performance can improve when driver agent 107 offloads the received packets to software 238 instead of to the secondary use model 236 for crypto operations.

As explained earlier, the secondary use model 236 requires use of resources from NI 106. For example, such resources can include the transmit queue, Direct Memory Access (DMA) resources (one or more modules dedicated to transferring data from the NIC to host memory), bus resources, and internal buffers. In situations where NI 106 is very busy, it is efficient to use software 238 instead of the secondary use model 236 to perform crypto operations. In such situations, using the secondary use model 236 to perform crypto operations can only exacerbate the problem of the load of NI 106. Driver agent 107 can detect the load of NI 106 by monitoring metrics such as, for example, transmit resources, receive resources, underruns, overruns, or bus utilization. In these embodiments, driver agent 107 measures metric value based on a load value. Load value can be based on metrics such as throughput, packet rate, interrupt load, and CPU utilization.

Further, performance tests have shown that secondary use model 236 is not worthwhile for small packets. The overhead of setting up the structures, transmitting the data across bus 101, and taking the extra interrupt when using the secondary use model 236 is more than the cost of processing the packets in software 238. However, performance tests have also shown that it is not efficient to process a portion of a traffic stream using secondary use model 236 and a portion using software 238. This is because packets are then indicated out of order. In such cases many protocol stacks, such as TCP protocol as implemented by Microsoft's operating system, can drop packets from the received packets, when they are indicated out of order. In these situations, driver agent 107 computes an average packet size using the offloaded packets during a predetermined time. Driver agent 107 then compares the computed average packet size to an average threshold size.

In some embodiments, the average packet size is computed by incrementing a counter associated with the SA each time packets arrive, based on the size of the received packets. If the ratio is less than or equal to a threshold value, the packets are processed via software 238, and if the ratio is greater than the threshold value, the packets are processed via secondary use model 236. Driver agent 107 then dynamically maps and offloads the received packets to use a most efficient component in the available components for crypto operations, based on the outcome of the comparison. In some embodiments, driver agent 107 offloads the received packets to software 238 for crypto operations when the computed average packet size is less than or equal to the average threshold size.

In some embodiments, driver agent 107 computes a ratio of small packet to large packet using the offloaded packets obtained during a predetermined time period. In some embodiments, a timer 240 is used to monitor the received packets during a predetermined time. Driver agent 107 then compares the computed ratio to a predetermined ratio. Driver agent 107 then dynamically maps and offloads the received packets to use an efficient component in the available components for crypto operations, based on the outcome of the comparison to improve performance.

In some embodiments, a flag is set in the SA structure to use software 238 for crypto operations, when the computed ratio is greater than or equal to the predetermined ratio. Also in these embodiments, a flag is set in the SA structure to use the secondary use model 236 for crypto operations, when the computed ratio is less than the predetermined ratio to improve system performance during crypto operations. After completing the crypto operations on the offloaded packets, counters are cleared for set flags, so that the ratio that is computed the next time is an accurate representation of the time period between timer expirations.

In these embodiments, driver agent 107 identifies a "small packet" and a "large packet" from the received packets during a predetermined time. Driver agent 107 then computes a ratio of small packet to large packet and compares the computed ratio to a predetermined ratio. Driver agent 107 then dynamically maps the next offloaded packets to software 238 for crypto operations based on the outcome of the comparison. In these embodiments, driver agent 107 dynamically maps the next offloaded packets to software 238 for crypto operations, when the computed ratio is less than or equal to a predetermined ratio. Also, in these embodiments, driver agent 107 maps the next offloaded packets to secondary use model 236 for crypto operations, when the computed ratio is greater than the threshold ratio.

In some embodiments, driver agent 107 at times and/or periodically compares the ratio of "large" and "small" packets and maps the data stream to secondary use model 236 processing or software 238 processing, based on the outcome of the comparison. If the ratio is less than or equal to a threshold value, the entire stream of packets is processed via a software 238 component, and if the ratio is greater than the threshold value, the entire stream of packets is processed via secondary use model component 236.

Figure 3:
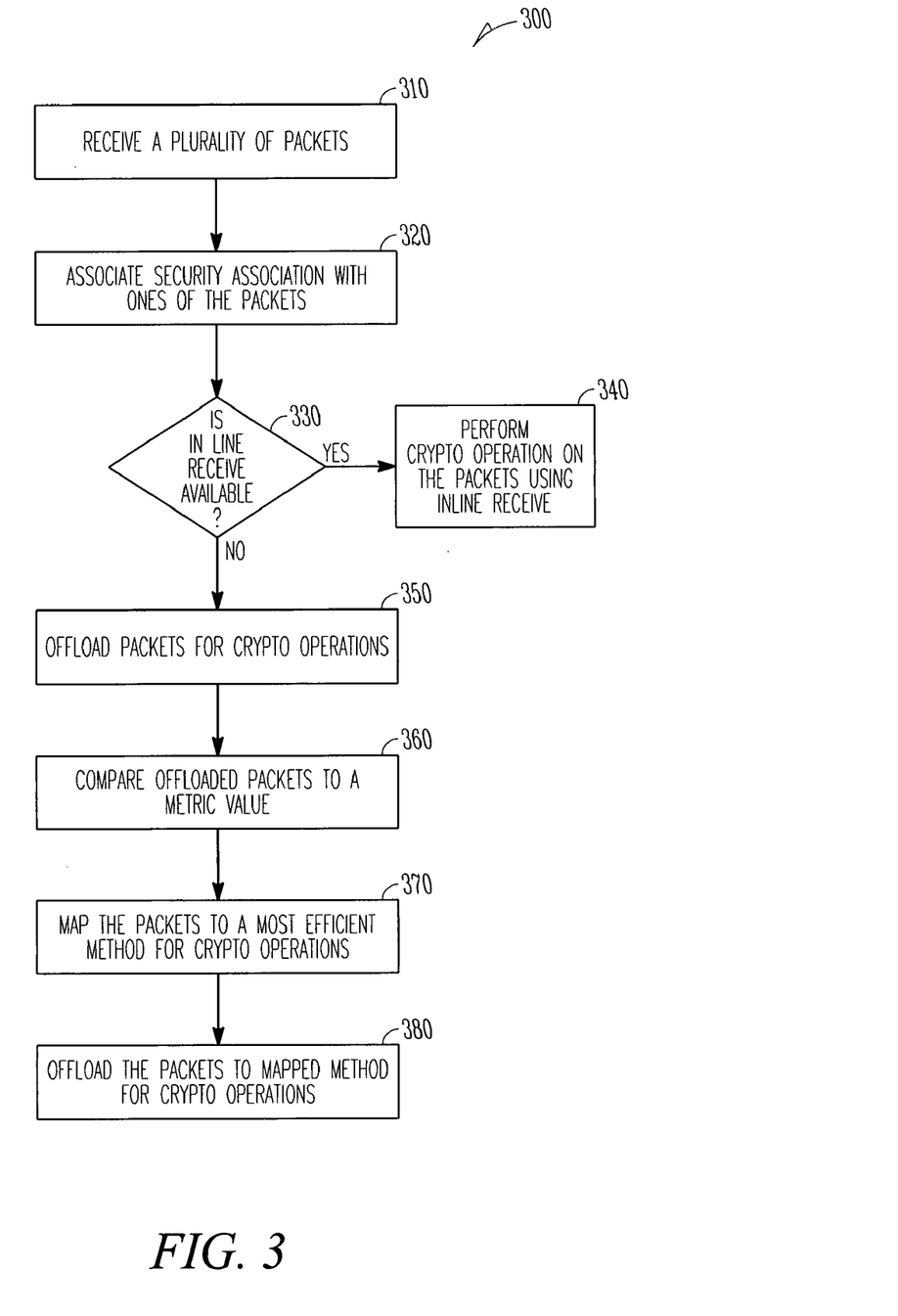
FIG. 3 is a flowchart illustrating a method to offload received packets for crypto operations, in accordance with one embodiment of the present subject matter.

FIG. 3 is a flowchart 300 illustrating a method to offload received packets for crypto operations, in accordance with one embodiment of the present subject matter.

Block 310 receives packets from a traffic stream. In some embodiments, each of the received packets includes multiple data and latency-sensitive data packets. The latency-sensitive data packets include data such as, for example, acknowledgment (ACK) data, length of the received fragment of electronic data, priority designation, transport control protocol (TCP) port, and security encryption information.

Block 320 associates a security association with ones of the received packets for crypto operations. In some embodiments, a security association is associated with each received packet.

Block 330 checks whether Inline Receive is available for performing crypto operations on the security-associated packets. In some embodiments, the determination of the possibility of using Inline Receive for crypto operations includes comparing the availability of memory in the Inline Receive cache to a threshold cache value. Crypto operations include operations such as, for example, decrypting, and authenticating the received packets. If Inline Receive is available for performing crypto operations, the packets go to block 340. If Inline Receive is not available for crypto operations, the packets go to block 350.

Block 340 performs crypto operations on the packets using Inline Receive. Inline Receive is a preferred process for performing crypto operations on the received packets because Inline Receive is generally a more efficient method than the secondary use model or software.

Block 350 offloads the security-associated packets for crypto operations.

Block 360 includes further comparing the offloaded packets to a metric value. In some embodiments, the metric value is based on a policy metric that identifies offloaded packets that can be processed using software instead of a secondary use model to increase efficiency during crypto operations on the received packets. A policy metric can also be based on identifying the most efficient process to perform crypto operations on the offloaded packets, i.e., to process using the secondary use model or software. In some embodiments, a policy metric can include policy metrics, such as MD5 authentication using AH, which identifies software for crypto operations as the more efficient method for the offloaded packets.

Block 370 maps the offloaded packets to a most efficient method of available methods to perform crypto operations based on the outcome of the comparison. Available methods to perform crypto operations on the offloaded data can include methods such as hardware and software. A hardware method can be based on a secondary use model. In some embodiments, the packets are offloaded dynamically to a most efficient method available to perform the crypto operation.

In some embodiments, the offloaded packets are mapped to software for efficient crypto operations based on a policy metric value. Metric values can be based on measured load values such as, for example, throughput, packet rate, interrupt load, and CPU utilization. In some embodiments, dynamic mapping includes comparing the load value to a load threshold value and then dynamically mapping the offloaded packets to a most efficient method of the available methods based on the outcome of the comparison.

Block 380 offloads the packets to the mapped method for efficient crypto operations on the offloaded packets.

Figure 4:
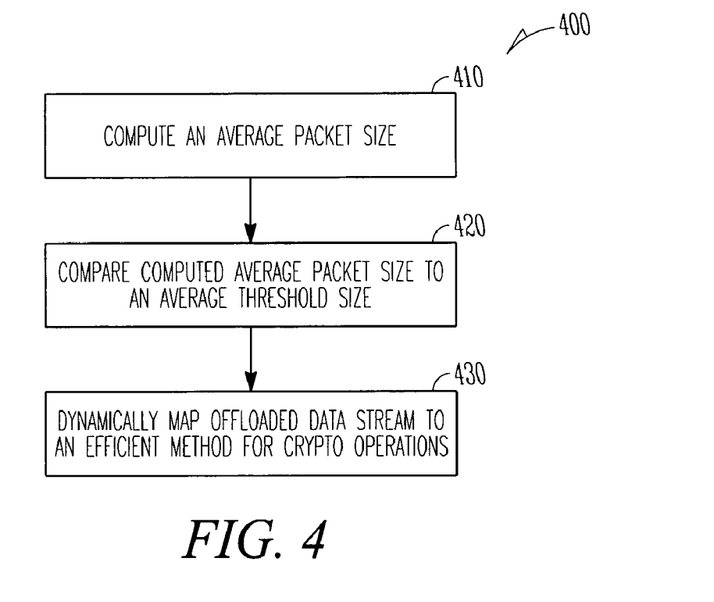
FIG. 4 is a flowchart illustrating another embodiment of a method to offload received packets for crypto operations, in accordance with one embodiment of the present subject matter.

FIG. 4 is a flowchart 400 illustrating another embodiment of a method to offload received packets for crypto operations, in accordance with one embodiment of the present subject matter.

Block 410 includes computing an average packet size using offloaded packets during a predetermined time.

Block 420 compares computed average packet size to an average packet size. In some embodiments, the average packet size is computed by incrementing a counter associated with the SA each time a packet arrives, based on the size of the received packet.

Block 430 dynamically maps the offloaded packets to a most efficient method of the available methods, based on the outcome of the comparison.

Figure 5:
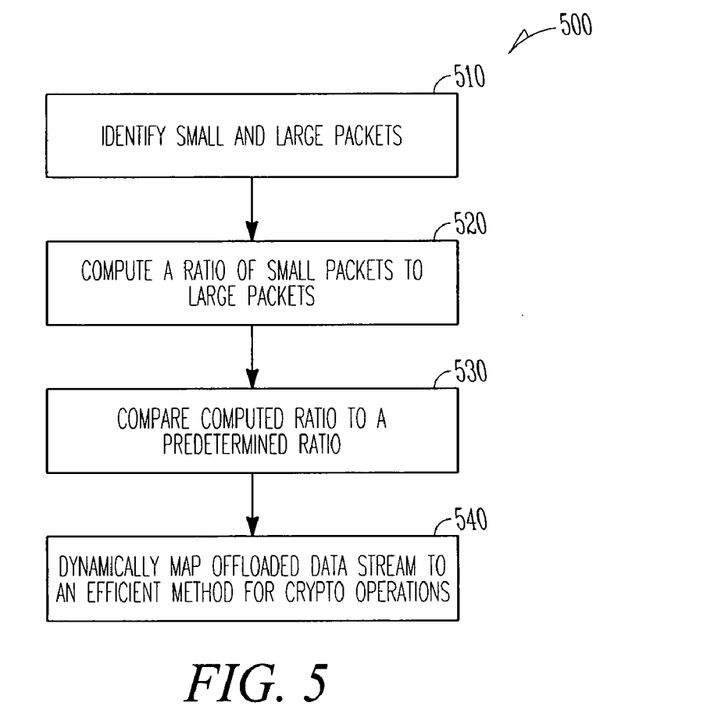
FIG. 5 is a flowchart illustrating yet another embodiment of a method to offload received packets for crypto operations, in accordance with one embodiment of the present subject matter.

FIG. 5 is a flowchart 500 illustrating yet another embodiment of a method to offload received packets for crypto operations, in accordance with one embodiment of the present subject matter.

Block 510 identifies each of the received packets in the offloaded packets as a "small packet" or a "large packet" during a predetermined time. In these embodiments, each of the received packets, during a predetermined amount of time, is compared to an average threshold size, and a small packet counter or a large packet counter is incremented, based on the outcome of the comparison, to obtain the number of small and large packets in the received offloaded packets during the predetermined time.

Block 520 computes a ratio of the number of small packets to the number of large packets during the predetermined amount of time. In some embodiments, a timer is used to monitor the received packets during the predetermined time.

Block 530 compares whether the computed ratio exceeds a predetermined ratio.

Block 540 dynamically maps and offloads the received packets to use an efficient method from the available methods to perform crypto operations, based on the outcome of the comparison, to improve performance. In some embodiments, a flag is set in the SA structure to use software for crypto operations for the entire stream of packets, when the computed ratio is greater than or equal to the predetermined ratio. Also in these embodiments, a flag is set in the SA structure to use the secondary use model for crypto operations on the entire stream of packets, when the computed ratio is less than the predetermined ratio to improve system performance during crypto operations. After completing the comparison for the offloaded packets, counters are cleared so that the next computed ratio is an accurate representation of the time period between timer expirations. In some embodiments, a timer can be set so that Block 530 can at times and/or periodically compare the computed ratio to a predetermined ratio and offload the packets for crypto operations, based on the outcome of the comparison.

Although the flowcharts 300, 400, and 500 include blocks that are arranged serially in the exemplary embodiments, other embodiments of the subject matter may execute two or more blocks in parallel, using multiple processors or a single processor organized as two or more virtual machines or sub-processors. Moreover, still other embodiments may implement the blocks as two or more specific interconnected hardware modules with related control and data signals communicated between and through the modules, or as portions of an application-specific integrated circuit. Thus, the exemplary process flow diagrams are applicable to software, firmware, and/or hardware implementations.

Various embodiments of the present subject matter can be implemented in software, which may be run in the environment shown in FIG. 6 (to be described below) or in any other suitable computing environment. The present subject matter is operable in a number of general-purpose or special-purpose computing environments. Some computing environments include personal computers, general-purpose computers, server computers, hand-held devices (including, but not limited to, telephones and personal digital assistants of all types), laptop devices, multi-processors, microprocessors, set-top boxes, programmable consumer electronics, network computers, minicomputers, mainframe computers, distributed computing environments and the like to execute code stored on a computer-readable medium. The present subject matter may be implemented in part or in whole as machine-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Figure 6:
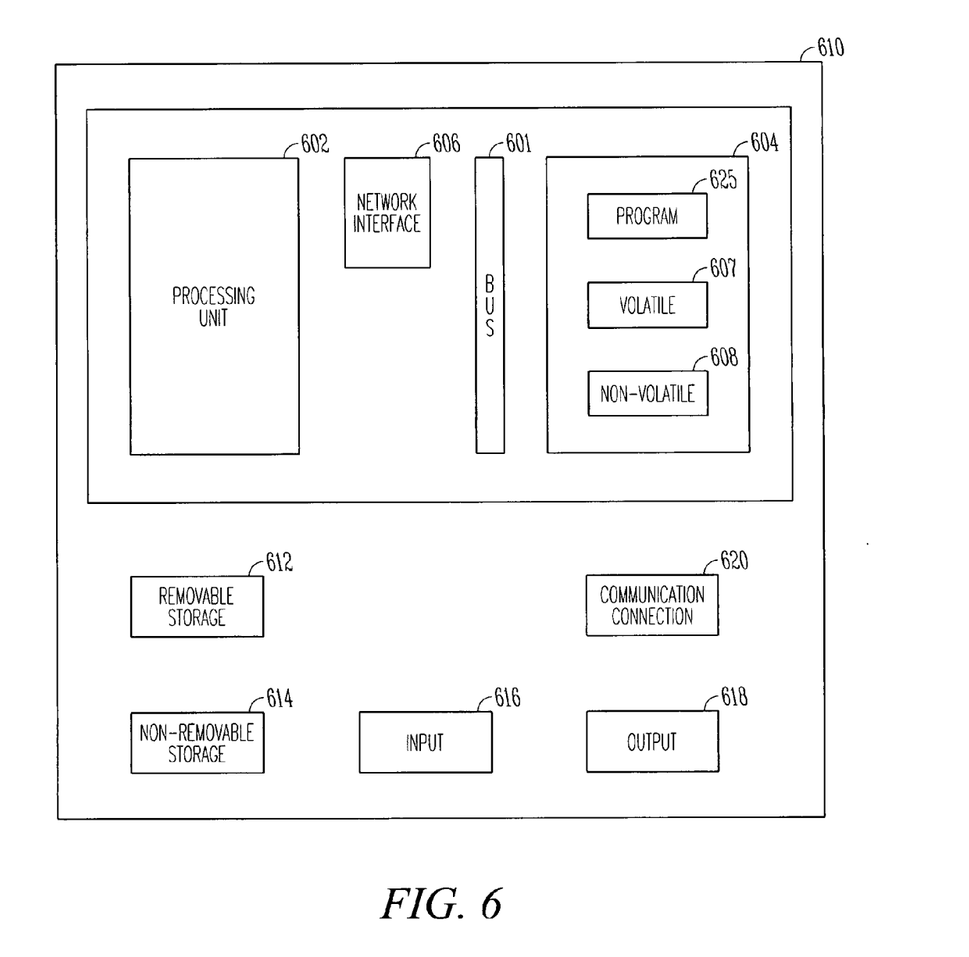
FIG. 6 is an example of a suitable computing environment for implementing embodiments of the present subject matter.

FIG. 6 shows an example of a suitable computing system environment for implementing embodiments of the present subject matter. FIG. 6 and the following discussion are intended to provide a brief, general description of a suitable computing environment in which certain embodiments of the inventive concepts contained herein may be implemented.

A general computing device, in the form of a computer 610, may include a processing unit 602, memory 604, removable storage 612, and non-removable storage 614. Computer 610 additionally includes a bus 601 and a network interface (NI) 606.

Computer 610 may include or have access to a computing environment that includes one or more input elements 616, one or more output elements 618, and one or more communication connections 620. The computer 610 may operate in a networked environment using the communication connection 620 to connect to one or more remote computers. A remote computer may include a personal computer, server, router, network PC, a peer device or other network node, and/or the like. The communication connection may include a Local Area Network (LAN), a Wide Area Network (WAN), and/or other networks.

In various embodiments, bus 601 can be similar or identical to bus 101 of FIGS. 1 and 2. NI 606 can be similar or identical to NI 106 in FIGS. 1 and 2. Processing unit 602 can be similar or identical to processor 102 in FIGS. 1 and 2. Memory 604 can be similar or identical to memory 103 in FIGS. 1 and 2. Removable storage 612 and non-removable storage 614 can be similar or identical to mass storage 105 in FIG. 1. Input 616 and output 618 can be similar to or identical to user interfaces 104 in FIG. 1. In one embodiment, communication connection 620 comprises a network interface, such as NI 106 of FIGS. 1 and 2. Communication connection 620 could also include a driver agent (not shown) implemented in hardware and/or software, and which may be similar or identical to driver agent 107 in FIGS. 1 and 2. Alternatively, a driver agent implemented in software could reside within memory 604.

The memory 604 may include volatile memory 607 and non-volatile memory 608. A variety of computer-readable media may be stored in and accessed from the memory elements of computer 610, such as volatile memory 607 and non-volatile memory 608, removable storage 612 and non-removable storage 614.

Computer memory elements can include any suitable memory device(s) for storing data and machine-readable instructions, such as read only memory (ROM), random access memory (RAM), erasable programmable read only memory (EPROM), electrically erasable programmable read only memory (EEPROM); hard drive; removable media drive for handling compact disks (CDs), digital versatile disks (DVDs), diskettes, magnetic tape cartridges, memory cards, Memory Sticks™, and the like; chemical storage; biological storage; and other types of data storage. "Processor" or "processing unit", as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit. The term also includes embedded controllers, such as Generic or Programmable Logic Devices or Arrays, Application Specific Integrated Circuits, single-chip computers, smart cards, and the like.

Embodiments of the invention may be implemented in conjunction with program modules, including functions, procedures, data structures, application programs, etc., for performing tasks, or defining abstract data types or low-level hardware contexts. Program modules, such as driver agent 107, security association table 234, secondary use model 236, software 238, and timer 240 shown in FIGS. 1 and 2, may be stored in memory 604 and associated storage media of the type(s) mentioned above.

Machine-readable instructions stored on any of the above-mentioned storage media are executable by the processing unit 602 of the computer 610. For example, a computer program 625 may comprise machine-readable instructions capable of offloading received electronic packets to one of the available methods based on a metric value to perform crypto operations, when Inline Receive is not available, to perform crypto operations, to improve system performance according to the teachings of the present subject matter. In one embodiment, the computer program 625 may be included on a CD-ROM and loaded from the CD-ROM to a hard drive in non-volatile memory 608. The machine-readable instructions cause the computer 610 to offload the received electronic packets to one of the available methods according to the teachings of the present subject matter.

CONCLUSION

The above-described methods and apparatus provide various embodiments to improve throughput and system performance by dynamically offloading crypto operations on incoming packets by selecting the most efficient technique from one of the available processing techniques, when Inline Receive is not available to perform crypto operations.

It is to be understood that the above description is intended to be illustrative, and not restrictive. Many other embodiments will be apparent to those of skill in the art upon reviewing the above description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described above with respect to the methods illustrated in FIGS. 3, 4, and 5 can be performed in a different order from those shown and described herein.

FIGS. 1, 2, and 6 are merely representational and are not drawn to scale. Certain proportions thereof may be exaggerated, while others may be minimized. FIGS. 1×6 illustrate various embodiments of the invention that can be understood and appropriately carried out by those of ordinary skill in the art.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of the embodiments of the invention, with each claim standing on its own as a separate preferred embodiment.

What is claimed is:

1. A method comprising:
    receiving a plurality of packets;
    associating a security association with at least one of the packets;
    determining whether an inline receive function is available to perform crypto operations on the security-associated packets;
    selectively using the inline receive function to perform crypto operations on the security-associated packets in response to the availability of the inline receive function; and
    selecting one of a plurality of alternative methods adapted to perform crypto operations in response to the unavailability of the inline receive function based upon comparing the packets to a metric value; and
    using one of the plurality of alternative methods to perform crypto operations on the off-loaded security-associated packets.

2. The method of claim 1 wherein, in receiving, the packets comprises multiple data packets and latency-sensitive packets.

3. The method of claim 1, wherein determining comprises:
    comparing an amount of memory available in an inline receive cache to a threshold cache value; and
    determining the availability of the inline receive function for crypto operations based on the outcome of the comparison.

4. The method of claim 1, wherein the alternative methods includes at least one of a hardware method and a software method, and wherein the hardware method comprises a secondary use model.

5. The method of claim 1, wherein the crypto operations comprises operations selected from the group consisting of encrypting, decrypting, and authenticating.

6. The method of claim 1, wherein selecting comprises:
    mapping the packets to a most efficient method of the plurality of alternative methods to perform crypto operations based on the outcome of comparing.

7. The method of claim 6 wherein, in comparing, the metric value comprises a policy metric that identifies the packets that can be efficiently processed during crypto operations using software.

8. The method of claim 7 wherein, in comparing, the policy metric comprises an MD5 authentication algorithm using AH.

9. The method of claim 7, wherein the metric value comprises a load value, and wherein the load value is determined using values selected from the group consisting of throughput, packet rate, interrupt load, and CPU utilization.

10. The method of claim 9, wherein mapping the packets comprises:
    comparing the load value to a load threshold value; and
    dynamically mapping the packets to the software for performing crypto operations based on the outcome of comparing.

11. The method of claim 10, wherein dynamically mapping the packets to the software for crypto operations comprises:
    at times comparing the load value to the load threshold value; and
    dynamically mapping the packets to the software when the load value is greater than or equal to the load threshold value.

12. The method of claim 6, wherein mapping comprises dynamically mapping the packets to the software for performing crypto operations, based on the policy metric.

13. The method of claim 12, wherein dynamically mapping the packets comprises:
    computing an average packet size of packets during a predetermined time;
    comparing the computed average packet size to an average threshold size; and
    dynamically mapping the packets to the software based on the outcome of comparing.

14. The method of claim 13, wherein dynamically mapping the packets to the software for crypto operations comprises:
dynamically mapping the packets to the software for crypto operations when the computed average packet size for the packets is less than or equal to the average threshold size.

15. The method of claim 12, wherein dynamically mapping the packets comprises:
identifying a small packet and a large packet in the packets during a predetermined time; computing a ratio of the small packet to the large packet using the identified small packet and large packet;
comparing the computed ratio to a predetermined ratio; and dynamically mapping the packets to the software for crypto operations based on the outcome of comparing.

16. The method of claim 15, wherein dynamically mapping the packets to software for crypto operations comprises:
dynamically mapping the packets to software for crypto operations when the computed ratio is less than or equal to the predetermined ratio; and
dynamically mapping the packets to secondary use for crypto operations when the computed ratio is greater than the predetermined ratio.

17. The method of claim 6, further comprising offloading the packets to the mapped method to perform the crypto operations.

18. An apparatus comprising:
a network interface configured to receive a plurality of packets and adapted to offload the packets when the network interface is not available to perform crypto operations on the packets; and
a driver agent coupled to the network interface to receive the offloaded packets from the network interface, wherein the driver agent is configured to associate a security association with at least one of the packets and map the security-associated packets to one of a plurality of alternative components based upon a metric value, the alternative components adapted to perform crypto operations on the security-associated packets.

19. The apparatus of claim 18, wherein the network interface comprises:
a buffer to receive the packets;
a processor coupled to the buffer; and
an inline receive element, coupled to the processor and configured to perform crypto operations, wherein the processor offloads the packets to one of the plurality of alternative components based on the metric value when the inline receive element is not available to perform crypto operations on the packets.

20. The apparatus of claim 19, wherein the metric value is based on a load value, and wherein the load value is measured using metrics selected from the group consisting of throughput, packet rate, interrupt load, and CPU utilization.

21. The apparatus of claim 18, wherein the plurality of packets comprise packets selected from the group consisting of data packets and latency-sensitive packets.

22. The apparatus of claim 18, wherein the alternative components comprise components selected from the group consisting of a secondary use model and software.

23. The apparatus of claim 22, wherein the metric value is based on a policy metric that improves system performance when the packets are offloaded to the software.

24. The apparatus of claim 22, wherein the network interface further comprises a cache, wherein the processor determines whether the inline receive element is available to perform crypto operations on the packets by comparing an amount of memory available in the cache to a threshold cache value, wherein the processor offloads the packets to the driver agent based on the outcome of the comparison, and wherein the driver agent compares the offloaded packets to the metric value and further offloads the offloaded packets to a component in the alternative components for crypto operations based on the outcome of the comparison.

25. The apparatus of claim 24, wherein the driver agent computes an average packet size using the offloaded packets during a predetermined time and compares the computed average packet size to an average threshold size, and maps the offloaded packets to software for crypto operations based on the outcome of the comparison.

26. The apparatus of claim 24, wherein the driver agent identifies a small packet and a large packet in the offloaded packets during a predetermined time and computes a ratio of small packet to large packet, compares the computed ratio to a predetermined ratio, and dynamically maps the next offloaded packets to software for crypto operations based on the outcome of the comparison.

27. An article comprising:
a memory element having instructions that, when executed by a computing platform, result in execution of a method comprising:
receiving a plurality of packets;
associating a security association with at least one of the packets;
determining at times whether an inline receive function is available to perform crypto operations on the security-associated packets;
selectively using the inline receive function to perform crypto operations on the security-associated packets in response to the availability of the inline receive function; and
selecting one of a plurality of alternative methods adapted to perform crypto operations in response to the unavailability of the inline receive function based upon comparing the packets to a metric value; and
using one of the plurality of alternative methods to perform crypto operations on the off-loaded security-associated packets.

28. The article of claim 27, wherein the memory element further comprises instructions that, when executed by the computing platform, result in execution of:
comparing the packets to a metric value;
mapping the packets to a most efficient method of the plurality of alternative methods to perform crypto operations based on the outcome of comparing; and
offloading the packets to the mapped method to perform the crypto operations.

29. The article of claim 28, wherein the metric value is based on a load value, and wherein the load value is measured using metrics selected from the group consisting of throughput, packet rate, interrupt load, and CPU utilization.

30. The article of claim 28, wherein the metric value is based on an average packet size computed from the offloaded packets during a predetermined time.

31. The article of claim 28, wherein the metric value is based on a ratio of small packet to large packet computed by evaluating the offloaded packets received during a predetermined time.

32. The article of claim 28, wherein the packets comprise multiple data and latency-sensitive packets.

33. The article of claim 27, wherein one of the alternative methods comprises methods selected from the group consisting of a hardware method and a software method, and wherein the hardware method comprises a secondary use model.

34. A system comprising:
a bus;
a processor coupled to the bus;
a memory coupled to the processor;
a network interface coupled to the processor and to the memory and configured to receive a plurality of packets and adapted to offload the packets when the network interface is not available to perform crypto operations on the packet; and
a driver agent coupled to the network interface to receive the offloaded packets from the network interface, wherein the driver agent is configured to associate each packet with a security-association and maps the offloaded packets to one of a plurality of alternative components based upon a metric value, the alternative components adapted to perform crypto operations on the offloaded packets.

35. The system of claim 34, wherein the network interface comprises an inline receive element configured to perform crypto operations on the offloaded packets using one of the plurality of alternative components based on the metric value when the inline receive element is not available to perform the crypto operations on the packets.

36. The system of claim 35, wherein the metric value comprises a policy metric that identifies the offloaded packets that can be efficiently processed during crypto operations using software.

37. The system of claim 35, wherein the metric value comprises a load value, and wherein the load value is measured using values selected from the group consisting of throughput, packet rate, interrupt load, and CPU utilization.

38. The system of claim 34, wherein the packets comprise packets selected from the group consisting of data packets and latency-sensitive packets.

39. The system of claim 34, wherein the driver agent is stored in the memory.

40. The system of claim 34, wherein the alternative components comprise components selected from the group consisting of a secondary use model and software.

41. The system of claim 34, wherein the crypto operations comprise operations selected from the group consisting of encrypting, decrypting, and authenticating.

42. The system of claim 34, further comprising:
a user interface coupled to the bus.

43. The system of claim 34, further comprising:
a mass storage device coupled to the bus.

* * * * *